United States Patent
Wolfe

(12) 
(10) Patent No.: US 6,553,708 B1
(45) Date of Patent: Apr. 29, 2003

(54) COMBINATION DOG BLIND DECOY

(75) Inventor: Richard M. Wolfe, Boise, ID (US)

(73) Assignee: Lone Wolfe LLC, Boise, ID (US)

( * ) Notice: Subject to any disclaimer, the term of this patent is extended or adjusted under 35 U.S.C. 154(b) by 0 days.

(21) Appl. No.: 09/327,922

(22) Filed: Jun. 8, 1999

Related U.S. Application Data

(60) Provisional application No. 60/088,839, filed on Jun. 10, 1998.

(51) Int. Cl.[7] .............................................. A01M 31/06
(52) U.S. Cl. ..................... 43/2; 43/3; 119/482; 119/501; 135/901
(58) Field of Search ................ 43/2, 3, 1; 119/482–484, 119/501, 463, 480; D30/119, 120, 108, 112, 118; 135/116, 901

(56) References Cited

U.S. PATENT DOCUMENTS 2,501,517 A    3/1950   Honald
2,804,083 A  * 8/1957   Wieber
3,063,414 A  * 11/1962  Huber
3,738,322 A  * 6/1973   Smith ........................... 119/15
3,757,741 A  * 9/1973   Siciliano ........................ 119/17
4,067,346 A  * 1/1978   Husted ......................... 135/4 R
4,291,645 A  * 9/1981   Cruchelow .................... 119/19
4,581,837 A    4/1986   Powlus
4,829,694 A  * 5/1989   Oasheim .......................... 43/1
5,075,999 A    12/1991  Fredericks
5,400,541 A  * 3/1995   Ennamorato ................. 135/100
5,592,960 A    1/1997   Williams
5,622,198 A  * 4/1997   Elsinger ...................... 135/128
5,678,346 A    10/1997  Kellett
D391,617 S     3/1998   Hill
6,016,823 A  * 1/2000   Hill ............................. 135/124

* cited by examiner

*Primary Examiner*—Yvonne Abbott
(74) *Attorney, Agent, or Firm*—TraskBritt

(57) ABSTRACT

A dog blind including a hollow body shell having a neck extending therefrom and configured as a waterfowl. The hollow body shell includes a chest region having a door therein for selectively releasing a dog, such as a retriever, restrained within the shell.

20 Claims, 1 Drawing Sheet

COMBINATION DOG BLIND DECOY

This application claims the benefit of U.S. Provisional Application No. 60/088,839, filed Jun. 10, 1998.

BACKGROUND OF THE INVENTION

Blinds to conceal hunters from overflying waterfowl are well known in the art. An example of a "mirrored" blind designed to reflect the blind's surroundings is disclosed in U.S. Pat. No. 5,592,960. Some blinds are also themselves configured as waterfowl, as shown in U.S. Pat. Nos. 2,501, 517, 4,581,837, 5,075,999, 5,678,346, and Des. No. 391, 617, all of which blinds are designed to conceal a hunter.

While dogs are used to retrieve fowl shot by hunters, little attention has been paid to an effective means to restrain the dogs and hide them from the fowl which would also promote easy release at an appropriate time. Many hunters keep their dogs inside a so-called "pit" blind dug into the earth, an approach which causes obvious problems getting a dog into and out of the blind. Pit blinds also have the disadvantage of being limited to one permanent location, while geese move from field to field in order to feed. Other hunters will just leave the dog sitting near the blind. In recent years, camouflage vests for dogs have become available. This approach does help camouflage the dog, but does not provide a restraint mechanism. In either instance, a dog left outside of the blind must be well-trained to remain motionless and not walk amongst the decoys placed near the blind when fowl are spotted. This is particularly critical when hunting geese, which have very keen eyesight and can detect very small movements. Of course, a hunter might very well place the dog in a standard kennel near his blind, but any object which is perceived by a goose as not "natural" to the field or to the decoy spread can flare (i.e., spook) the birds.

While the blind disclosed in U.S. Pat. No. 5,592,960 optionally employs a door at one side thereof for release of a dog, restraining an excitable dog in the same blind with hunters and loaded shotguns is undesirable, for obvious reasons. The blind of the '960 patent, with its reflective sides, also does not rely on blending in with the other decoys, but rather relies on its visual resemblance (through reflection thereof) to the surrounding terrain and topographical features.

Accordingly, there is a need in the art for a simple but effective enclosure for dogs in the field which will not only physically restrain a dog and also permit selective and rapid release of the dog when desired, but which will otherwise hide the dog and his or movements from the keen-eyed quarry without raising its suspicions.

BRIEF SUMMARY OF THE INVENTION

The present invention comprises a hunting blind for a dog which is configured as a waterfowl decoy and, more specifically, as a goose. The inventive blind will conceal and restrain a dog without having to place an object, such as a standard kennel, in the field, which might appear foreign or strange to a goose. Thus, the dog may be hidden as well as restrained when the hunters' guns are fired until it is deemed necessary to release the dog to retrieve the downed geese. In addition, the blind serves as a shelter protecting the dog from the elements.

In a preferred embodiment of the invention, the waterfowl body is configured as a hollow shell, and a door is provided within the chest portion of the body shell for entry and exit by the dog. It is also contemplated that the blind will be configured as a feeding goose, with its neck and head protruding in front of the chest for providing concealment of the door and minimizing the height of the blind in comparison to an upstanding or "sentry" style configuration of a goose exhibiting a raised head. This format will assist the blind in blending in with standard decoy shells employed by the hunter. The "feeder" configuration is also less alarming to overflying geese, being indicative of a calmer group of geese on the ground.

An optional automatic door release and/or closure mechanism may be provided with the inventive blind, and an optional floor may be provided as well.

DETAILED DESCRIPTION OF THE INVENTION

Figure 1:
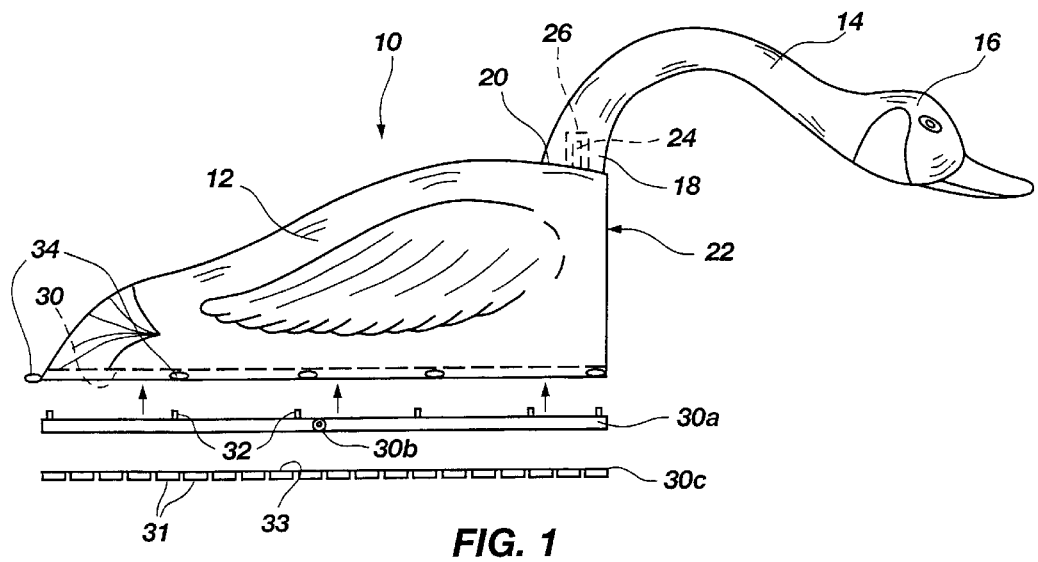
FIG. 1 comprises a side elevation of a an embodiment of the dog blind decoy of the present invention showing optional built-in and removable floor arrangements.
Figure 2:
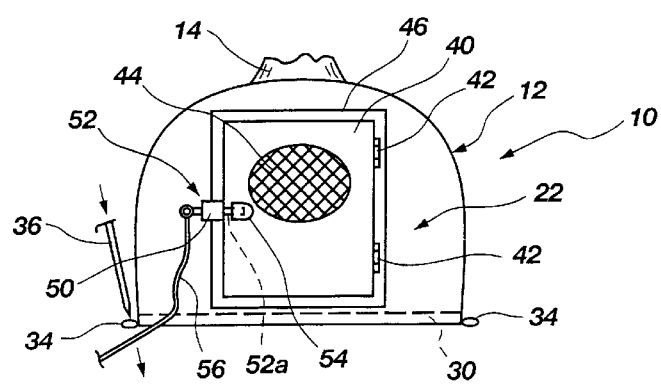
FIG. 2 comprises a front elevation of the embodiment of FIG. 1, depicting a door set in the chest of the blind decoy body.

Referring now to FIGS. 1 and 2, the dog blind decoy 10 of the present invention comprises a body shell 12 having a neck 14 and head 16 extending therefrom. It is preferred, as shown and as previously noted, that the neck 14 and head 16 extend forwardly of body shell 12 in a so-called "feeding" orientation. Body shell 12 may be formed in any suitable manner known in the art, such as by plastic injection molding, plastic sheet molding, laying glass fiber over a mold and binding it with a resin, forming a heavy wire frame over which is stretched a fabric or plastic sheeting shell, forming a skeleton or frame of ribs over which an outer shell is placed, or otherwise. It is presently contemplated that the body shell 12 is preferably formed by injection molding. Body shell 12 should be sufficiently robust to withstand the effects of wind and weather, as well as vigorous movement by a dog enclosed within. Neck 14 with head 16 is preferably formed separately from body shell 12 for ease of transport to the hunting site, where the base 18 of neck 14 is secured to body shell 12 at location 20 above chest 22 of the body shell 12. Neck 14 and head 16 may be of plastic molded, or other suitable, construction. Neck 14 may be secured to body shell 12 by screws or bolts and may be stabilized against movement under wind and rain contact by a pin 24 extending from the body shell 12 into a receptacle 26 on neck 14, or vice versa. Other means of securement may be employed, such as a plastic twist-locking connection, a snap-fit connection, a hook-and-loop fabric connection, etc. The exterior of the entire dog blind decoy preferably exhibits the feather arrangement and coloring of a goose.

As shown in broken lines in FIG. 1, an integral, permanently attached floor 30 may be provided, or a separate floor 30a employed and fastened on-site to body shell 12 with securing elements 32 such as bolts, screws, snaps, quick-release clamps, hook-and-loop fabric patches, or otherwise as known in the art. A two-piece removable floor 30a may be hinged in the center 30b to facilitate folding for transport and storage. Alternatively, a floor 30c may be employed comprising a plurality of parallel slats 31 laterally joined by an overlying fabric floor 33 in a tambour arrangement as is found in a roll-top desk so as to be rollable for compact storage and transport. Use of a floor such as 30, 30a or 30c provides additional protection and comfort for a dog within dog blind decoy 10, and an optional blanket or pad may be employed on the floor 30, 30a or 30c for additional padding and insulation from the often-cold, damp ground. Using a floor of any of the foregoing types or otherwise would also prevent the dog from moving the blind and/or escaping from he blind without having to anchor body shell 12 to the ground.

Also, as shown in FIGS. 1 and 2, and particularly useful if an optional floor is not to be employed, retention elements 34 in the form of rope loops or D-rings may be provided at the periphery of the bottom of body shell 12 to receive stakes 36 driven therethrough to hold the dog blind decoy 10 to the ground under adverse conditions and prevent a dog within from upsetting it and getting loose.

Referring to FIG. 2, a door 40 is provided in the chest 22 of blind body shell 12, hinged at one side at hinge points 42 and including a screen 44 to provide ventilation and a sight line for the dog. As shown in FIG. 1, chest 22 is flat for simplicity of attachment of door 40. The chest 22 and screen 44 are preferably camouflaged with appropriate colors in a selected pattern in the same manner as the rest of body shell 12 for additional concealment from overflying geese. To prevent undue flexing and possible jamming of door 40, a reinforced door frame 46 is provided at the periphery of door 40. Door 40 may be similarly reinforced. Such reinforcing may comprise, for example, lightweight aluminum members secured to the chest and/or door material, or molded-in ribs. While depicted as rectangular, door 40 might be round, oval or some other suitable shape. The door 40 might be hinged at the top, rather than at the side, to provide a wider effective exit for the dog. A latching device 50 is provided opposite hinges 42 to retain door 40 in a closed position until the hunter desires to release the dog. This is significant because many young dogs will break (i.e., run) at the sound of a gun.

At its simplest, a simple gate latch might be employed as latching device 50. In order to permit the hunter at least to remain in his blind initially, the latching device might comprise a spring-loaded bolt mechanism 52 having a bolt 52a extending over the front of the door 40 and preferably into a receptacle 54. Bolt 52a may be withdrawn remotely by the hunter using a cable, rope or string 56 extending to the hunter's blind. The door itself might be spring-loaded to an open position, as by torsionally spring-loading hinges 42, to facilitate quick release of the dog.

A more complex remote control system for the door 40 might be employed to permit the hunter to remotely close as well as open the door 40. Such an arrangement might be effected with a continuous loop of rope and pulleys if the hunter's blind is relative close. Alternatively, door 40 might be spring-loaded to one position (open or closed) and pulled with a rope or cable to the other position. Of course, a power-driven door might be used, but this would necessitate a power source in the field or built into the blind, such as a replaceable or rechargeable battery.

Figure 3:
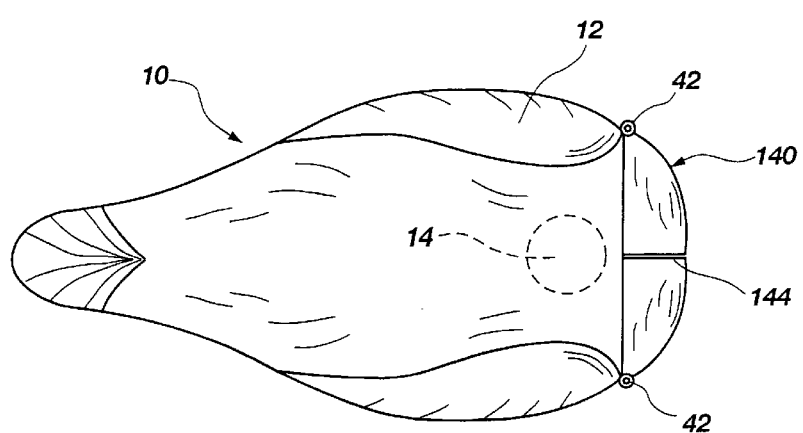
FIG. 3 comprises a top elevation of another blind decoy body embodiment with a rounded door in the chest.

FIG. 3 depicts another door design, wherein a door 140 is rounded or convex to mimic the protruding chest of a goose, and either hinged at 42 at one side of body shell 12, or split in the center as shown at 144 and hinged at 42 on both sides. As with door 40, a camouflaged screen (not shown) is employed for sight and ventilation.

By way of example only and not limitation, a dog blind decoy 10 of the present invention may have a body shell 12 about 48 inches long and about 24 inches high and 24 inches wide, adequate to comfortably enclose a dog such as a Labrador, Chesapeake or Golden Retriever. The length and size of neck 14 and size of head 16 are preferably in proportion to the body shell 12, so as to present the most natural look to overflying geese.

While the present invention has been disclosed in terms of a particular embodiment and variations thereof, those of ordinary skill in the art will understand and appreciate that it is not so limited, and that additions deletions and modifications to the embodiment as disclosed may be effected without departing from the scope of the invention.

What is claimed is:

1. A dog blind configured as, and having exterior markings and coloration of, a waterfowl, comprising:
    a substantially rigid, self-supporting hollow body shell including a chest region at a front portion thereof,
    a neck bearing a head thereon, the neck extending from the body shell; and
    a door located in the chest region, said door configured to be secured in a closed position from the exterior.

2. The dog blind of claim 1, wherein the door is hinged to the body shell and farther including a latch to secure the door in a closed position.

3. The dog blind of claim 2, wherein the door comprises a single panel.

4. The dog blind of claim 2, wherein the door comprises two panels meeting proximate a center portion of the chest region and hinged proximate sides of the body shell.

5. The dog blind of claim 1, wherein the door includes a screen therein.

6. The dog blind of claim 1, wherein the door is spring-loaded to a position.

7. The dog blind of claim 1, further including a floor extending under a bottom portion of the body shell.

8. The dog blind of claim 7, wherein the floor is detachable from the body shell.

9. The dog blind of claim 8, wherein the floor is detachable along a lower periphery of the body shell.

10. The dog blind of claim 8, wherein the floor is foldable.

11. The dog blind of claim 10, wherein the floor is hinged at a substantially central location.

12. The dog blind of claim 8, wherein the floor comprises a plurality of laterally joined, parallel slats.

13. The dog blind of claim 1, further including retention elements disposed proximate a lower periphery of the body shell.

14. The dog blind of claim 13, wherein the retention elements comprise loops.

15. The dog blind of claim 1, wherein the neck is removable from the body shell.

16. The dog blind of claim 1, wherein the neck extends forwardly from the body shell and over the chest region.

17. The dog blind of claim 16, wherein the neck is removable from the body shell.

18. The dog blind of claim 1, further including a device configured for at least one of remotely opening and remotely closing the door.

19. A dog blind configured as, and having exterior markings and coloration of, a waterfowl, comprising:
  a substantially self-supporting hollow body shell including a chest region at a front thereof,
  a neck bearing a head thereon and extending from the body shell; and
  a door located in the chest region, said door configured to be secured in a closed position from the exterior.

20. A dog blind configured as, and having exterior markings and coloration of, a waterfowl, comprising:
  a hollow body, at least a portion of which is of molded construction, including a chest region at a front thereof;
  a neck bearing a head thereon extending from the body shell; and
  a door located in the chest region, said door configured to be secured in a closed position from the exterior.

* * * * *

UNITED STATES PATENT AND TRADEMARK OFFICE
CERTIFICATE OF CORRECTION

PATENT NO. : 6,553,708 B1  Page 1 of 1
DATED : April 29, 2003
INVENTOR(S) : Richard M. Wolfe It is certified that error appears in the above-identified patent and that said Letters Patent is hereby corrected as shown below:

<u>Column 4,</u>
Line 29, change the comma after "thereof" to a semicolon
Line 35, change "farther" to -- further --
Line 56, change "laterally joined" to -- laterally-joined --

<u>Column 5,</u>
Line 13, change the comma after "thereof" to a semicolon

Signed and Sealed this

Sixteenth Day of March, 2004

JON W. DUDAS
*Acting Director of the United States Patent and Trademark Office*